(12) United States Patent
Chase et al.

(10) Patent No.: US 6,472,669 B1
(45) Date of Patent: Oct. 29, 2002

(54) SILICON CARBIDE PHOTODIODE BASED FLAME SCANNER

(75) Inventors: Paul H. Chase, Bloomfield; Terry M. Grayson, Granby, both of CT (US); Donald J. Kwapien, Westfield, MA (US); James M. Niziolek, Enfield, CT (US)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/241,982

(22) Filed: Feb. 2, 1999

(51) Int. Cl.$^7$ .................................................. G01J 1/42
(52) U.S. Cl. ........................................ 250/372; 250/373
(58) Field of Search ................................ 250/372, 373; 431/13, 75, 79; 60/39.03

(56) References Cited

U.S. PATENT DOCUMENTS

| | | | |
|---|---|---|---|
| 3,185,846 A | 5/1965 | Gilbert et al. | |
| 3,280,882 A | 10/1966 | Hemker | |
| 3,321,634 A | 5/1967 | Innes | |
| 4,051,375 A | 9/1977 | Schuetz et al. | |
| 4,103,157 A * | 7/1978 | Green | 250/239 |
| 4,178,512 A * | 12/1979 | Frungel et al. | 250/461.1 |
| 4,368,031 A | 1/1983 | Chadshay | |
| 4,922,194 A * | 5/1990 | Gaussa et al. | 324/158.1 |
| 5,073,104 A | 12/1991 | Kemlo | |
| 5,245,196 A * | 9/1993 | Cabalfin | 250/554 |
| 5,467,185 A * | 11/1995 | Engeler et al. | 356/44 |
| 5,480,298 A * | 1/1996 | Brown | 431/79 |
| 5,544,478 A | 8/1996 | Shu et al. | |
| 5,608,515 A * | 3/1997 | Shu et al. | 356/43 |
| 5,670,784 A * | 9/1997 | Cusack et al. | 250/372 |
| 5,755,819 A | 5/1998 | Bonanni et al. | |
| 5,828,797 A * | 10/1998 | Minott et al. | 385/12 |

* cited by examiner

Primary Examiner—Constantine Hannaher
Assistant Examiner—Shun Lee
(74) Attorney, Agent, or Firm—Michael M. Rickin

(57) ABSTRACT

A flame scanner for effecting therewith individual burner flame discrimination in multi-fossil fuel fired steam generators. The subject flame scanner is based on the use therein of a silicon carbide photodiode that is operative for converting into a photocurrent ultraviolet light, which impinges upon the silicon carbide photodiode after passing through a focusing lens.

10 Claims, 3 Drawing Sheets

SILICON CARBIDE PHOTODIODE BASED FLAME SCANNER

BACKGROUND OF THE INVENTION

This invention relates to flame scanners, and more specifically, to a silicon carbide photodiode based flame scanner that is suitable for use for purposes of effecting therewith individual burner flame discrimination in multi-fuel boilers and furnaces.

Flame scanners are important instruments in the operation of the combustion systems of fossil fuel-fired steam generators. To this end, flame scanners are one of the primary inputs into the burner management system with which such fossil fuel-fired steam generators are normally suitably provided. The principal function of such flame scanners is to monitor the combustion process, which is occurring within the fossil fuel-fired steam generators, and to provide a signal, based on such monitoring thereby of the combustion process within the fossil fuel-fired steam generator, when a stable flame exists so as to thereby provide therethrough an indication that it is safe to continue feeding fossil fuel into the combustion chamber of the fossil fuel-fired steam generator in which the combustion process is taking place. In the event that the flame becomes unstable, or the flame is lost completely, the flame scanner is designed to be operative to provide a loss of flame signal to the burner management system whereby the burner management system in turn is designed to be operative to shut off the fossil fuel to the fossil fuel-fired steam generator before an unsafe operating condition develops within the fossil fuel-fired steam generator.

A requirement that exists with fossil fuel-fired steam generators that employ a wall-fired firing system is that each individual burner thereof must have a flame scanner cooperatively associated therewith that is capable of establishing the presence of a flame from the burner with which the flame scanner is cooperatively associated. In contrast to fossil fuel-fired steam generators that employ a wall-fired firing system, in fossil fuel-fired steam generators that employ a tangentially-fired firing system the conventional philosophy for monitoring the combustion process, which is occurring therewith in, has been to simply establish that the so-called "fireball", which is generated as a consequence of the combustion therewith in of the fossil fuel and air, is stable. To this end, the burner management system with which the fossil fuel-fired steam generators that employ a tangentially-fired firing system are equipped commonly utilize a two of four logic philosophy. In accordance with such two of four logic philosophy, at each elevation of the tangentially-fired firing system two of the four flame scanners on that elevation must be detecting the presence of a flame in order for it to be safe to continue feeding fuel to that elevation of the fossil fuel-fired steam generator. However, changes are today occurring in the industry whereby the operators of fossil fuel-fired steam generators that employ tangentially-fired firing systems are more and more looking to avail themselves of the same logic philosophy, insofar as flame scanning is concerned, as that which is utilized with fossil fuel-fired steam generators that employ wall-fired firing systems, that is, to provide a flame scanning means to monitor the flame of each individual burner.

Heretodate, the existing forms of flame scanners have relied on essentially two approaches to detect the presence of flame. The first of these two approaches involves the use of a photodiode to measure the light intensity from the flame. Based on such measurements an electrical current output is produced, which is proportional to the intensity of light on the photodiode. Typically, silicon and gallium phosphide photodiodes are utilized for such purpose. Moreover, frequently optical filters are employed to make the flame scanners more sensitive to particular wavelengths of light that are emitted from specific fossil fuels or under specific firing conditions. The second of these two approaches involves the use of an ultraviolet tube, which operates to produce a pulsed electrical output whose pulse rate is proportional to the intensity of the ultraviolet. In accordance with the teachings of the prior art, ultraviolet tubes historically have been the approach of choice for monitoring gas flames since the emission from the gas flame is primarily in the ultraviolet with only minimal visible light emissions. The photodiode approach, on the other hand, is used for monitoring oil flames and coal flames due to the high emissions therefrom, which are in the visible light and near infrared.

Notwithstanding the use heretofore in the prior art of the aforedescribed two approaches, it has unfortunately proven, however, to be difficult in many situations to be able to distinguish the near field burner flame from the background flame generated from adjacent burners. Generally, the primary method that is utilized for purposes of effecting a separation of the background flame from the near flame is to focus not only on an examination of the measured intensity but to also focus on an examination of the so-called "flicker frequency" of the signal from the photodiode, which is being measured. To this end, it has been found that near field flame will typically have a higher "flicker frequency" than do the background flames. Effecting a discrimination between the near field flame and the background flames has proven to be particularly difficult when the near field flame is being produced as a consequence of the firing of gas, whereas the background flames are being produced as a consequence of the firing of other forms of fossil fuels, such as oil or coal. The latter fossil fuels, i.e., oil and coal, are highly luminous, which means that the light emissions in the visible and near infrared are many orders of magnitude higher than the ultraviolet emissions being produced from the near field gas flame.

Continuing, the interference produced by the aforementioned background flames has been found to be more pronounced when silicon photodiodes are utilized. Moreover, this has been found to be so by virtue of the fact that silicon photodiodes have proven to be more responsive in the visible and near infrared spectral regions and by virtue of the fact that silicon photodiodes have been shown to not have very good response in the ultraviolet range, unless filtered. Ultraviolet tubes are sensitive in the ultraviolet range and as such may be deemed to provide better results than do silicon photodiodes under certain circumstances. However, ultraviolet tubes also have historically been shown to possess some drawbacks. Namely, ultraviolet tubes have relatively limited operational lives and mechanical shutters are typically required to provide some feedback that the tubes are operating correctly. Additionally, ultraviolet tubes require complex circuitry to permit extraction and differentiation of both intensity and flicker frequency signals.

To thus summarize, the problem with which operators of fossil fuel-fired steam generators are being faced is their need to have a flame scanner that is reliable and yet is capable of distinguishing near field flame operation over background flames. Moreover, such a flame scanner must be capable of doing so under all firing conditions and without requiring that the setpoints be changed on such a flame scanner when the type of fossil fuel being fired in the fossil fuel-fired steam generator changes.

There have been numerous modifications made over the years insofar as flame scanners that are suitable for use for purposes of effecting therewith the detection of the presence of a flame in fossil fuel-fired steam generators are concerned. By way of exemplification and not limitation in this regard, the resultant of one such modification is the flame scanner that forms the subject matter of U.S. Pat. No. 3,185,846 entitled "Ultra-Violet Radiation Flame Monitor", which issued on May 25, 1965. In accordance with the teachings of U.S. Pat. No. 3,185,846, a device is provided for monitoring the flame in a combustion chamber, the flame being produced as a consequence of the burning within the combustion chamber of a fuel containing hydrogen and carbon. The subject device comprises a casing adapted to be mounted on the wall of the combustion chamber, a tubular extension extending from said casing into the combustion chamber, and a radiation responsive detector mounted in said extension adjacent the end nearest the flame to receive radiation therefrom, and an electric circuit positioned within said casing responsive to conduction or non-conduction of said detector to manifest the existence or non-existence of the flame. Continuing, the radiation responsive detector is sensitive only to invisible ultraviolet radiation produced by the burning of hydrogen in the fuel and operative to become electrically conductive in response to ultraviolet radiation.

The resultant of a further one of such modifications is the flame scanner that forms the subject matter of U.S. Pat. No. 3,280,882 entitled "Flame detector Arrangement", which issued on Oct. 25, 1966. In accordance with the teachings of U.S. Pat. No. 3,280,882, there is provided a flame detector, which is designed to be so positioned relative to the burner it is supervising as to positively discriminate between the monitored burner and adjacent burners and to provide a sensitivity sufficient not to cause false interruptions of burner fuel supply due to the normal variations in burner operation. To this end, in accordance with the teachings of U.S. Pat. No. 3,280,882 an ultraviolet flame sensing device is associated with a fuel burner assembly including a tubular burner nozzle adapted to pass a stream of pulverized coal and carrier air through a port formed in a boundary wall of a furnace, with provisions for mixing additional combustion air with and dispersing the fuel as it passes through the burner port. The aforesaid fuel dispersal provisions include an impeller normally located outside of and close to the discharge end of the burner nozzle and supported by and attached to one end of a pipe extending coaxially through the burner nozzle. The flame sensing device comprises a detector tube disposed within the impeller support pipe and contiguous to the impeller and looking directly into the bright ignition zone immediately downstream of the impeller. This detector tube location provides a clear and unobstructed view of the ignition zone and a flame signal of optimum reliability in respect to sensitivity and discrimination.

The resultant of yet a further one of such modifications is the flame scanner that forms the subject matter of U.S. Pat. No. 3,321,634 entitled "Photosensitive Flame Monitoring Circuit", which issued on May 23, 1967. In accordance with the teachings of U.S. Pat. No. 3,321,634 there is provided a circuit for flame monitoring apparatus, which is adapted to provide a signal representative of the ratio of flame fluctuations to average flame brightness including a photoconductive cell, a silicon junction diode or device of equivalent character connected in series with the cell and arranged substantially to compensate by its increased A. C. resistance at lower currents for diminished flicker response of the cell at lower illuminations, and means for passing an A. C. signal representative of radiation fluctuations at the cell to a second silicon junction diode or device of equivalent character receiving a current controlled by the cell and representative of average illumination of the cell and providing an A. C. output signal.

The resultant of yet still a further one of such modifications is the flame scanner that forms the subject matter of U.S. Pat. No. 4,051,375 entitled "Discriminating Flame Detector", which issued on Sep. 27, 1977 to the same assignee as that to which the present patent application is assigned. In accordance with the teachings of U.S. Pat. No. 4,051,375, a device is provided for discriminating between the presence of flame in a selected position and the presence of flame in nearby locations within a combustion area. A means for detecting electromagnetic radiation having wavelengths known to be characteristic of the base of the flame but not of the rest of the flame is aimed at the position at which the base of the flame to be monitored will occur if the flame is present. The intensity of the radiation having the given wavelengths is compared with the intensity of radiation having nearby wavelengths, and the relative magnitudes of the two intensities are used as an indication of whether flame is present or absent at the selected position.

The resultant of another such modification is the flame scanner that forms the subject matter of U.S. Pat. No. 4,368,031 entitled "Stationary Flame Scanner For Tilting Burner", which issued on Jan. 11, 1983 and which is assigned to the same assignee as the present patent application. In accordance with the teachings of U.S. Pat. No. 4,368,031, a flame monitoring system is provided for use on the furnace of a vapor generator employing tiltable burners, and particularly on a furnace equipped with tilting burners arranged in accord with the tangential firing method.

Each burner is provided with its own individual scanner. Each scanner is disposed to sight transversely across the base of the flame emanating from its associated burner. A plurality of at least three light transmission tubes are stationarily mounted within each scanner head with at least one tube mounted to sight at an upward acute angle across the flame, at least one other tube mounted to sight horizontally across the flame, and at least a third tube mounted to sight at a downward acute angle across the flame. A separate fireball scanner is mounted in the waterwall and aimed to sight at the center of the furnace to monitor the fireball formed therein by the flames emanating from the individual burners.

The resultant of yet another such modification is the flame scanner that forms the subject matter of U.S. Pat. No. 5,073,104 entitled "Flame Detection", which issued on Dec. 17, 1991. In accordance with the teachings of U.S. Pat. No. 5,073,104, there is provided a method and apparatus of detecting the condition of a flame having an emf by electrically conducting the emf generated by the flame as a signal to a sensor through an electrically isolated conductor means and sensing with said sensor an electrical parameter, which is a measure of the emf of the flame, and wherein the parameter is the ratio of the A.C. and D.C. signal levels.

Thus, although the numerous modifications, which have been made over the years especially of the type to which reference, by way of exemplification and not limitation, has been had hereinbefore insofar as flame scanners that are suitable for use for purposes of effecting therewith the detection of the presence of a flame in fossil fuel-fired steam generators are concerned, allegedly have been demonstrated to be operative for the purpose for which they have been intended, there has nevertheless been evidenced in the prior art a need for a new and improved flame scanner that would be suitable for use particularly for purposes of effecting therewith individual burner flame discrimination in multi-fuel fired steam generators, i.e., boilers and furnaces. More specifically, a need has been evidenced in the prior art for such a new and improved flame scanner that is characterized, by way of exemplification and not limitation, in that the flame scanner while being reliable nevertheless possesses the capability of being able to distinguish near flame operation over background flame. Moreover, such a new and improved flame scanner must possess such a capability of being able to distinguish near field flame operation over background flame under all firing conditions, and also in addition must be able to do so without having to necessitate that the setpoints on such a new and improved flame scanner be changed when there is a change in fuel type.

It is an object of the present invention to provide a new and improved flame scanner particularly suitable for employment in steam generators, i.e., boilers and furnaces.

It is a further object of the present invention to provide such a new and improved flame scanner, which is characterized in that when so employed in steam generators is operative both for purposes of reliably monitoring an individual burner flame and for purposes of detecting, based on such monitoring, unstable operation or flame-out conditions over all background firing conditions.

It is another object of the present invention to provide such a new and improved flame scanner, which is characterized in that the operation thereof is based on the use of a solid state photodiode, which is operative for purposes of effecting therewith the conversion of ultraviolet (UV) energy from the individual burner flame into electrical signals.

Another object of the present invention is to provide such a new and improved solid state photodiode based flame scanner, which is characterized in that the operation thereof is that of a multi-fuel flame scanner, which is designed for use with steam generators, i.e., boilers and furnaces, that fire gas, oil, coal, or any combination of these three fuels.

And still another object of the present invention is to provide such a new and improved solid state photodiode based flame scanner, which is characterized in that years of reliable service in a power plant environment are capable of being derived therefrom.

A further object of the present invention is to provide such a new and improved solid state photodiode based flame scanner, which is characterized in that the sensitivity thereof is only to the ultraviolet (UV) energy that is emitted from a near field burner flame.

Yet an object of the present invention is to provide such a new and improved solid state photodiode based flame scanner, which is characterized in that a near field flame signal is produced thereby, which has clear, distinct features over the signal produced by background radiation alone.

Yet a further object of the present invention is to provide such a new and improved solid state photodiode based flame scanner, which is characterized in that the presence of burner flame can be reliably determined thereby without having to change trip setpoints when fuels are changed.

Yet another object of the present invention is to provide such a new and improved solid state photodiode based flame scanner, which is characterized in that the use thereof is equally well suited either for new applications or for retrofit applications.

Yet still another object of the present invention is to provide such a new and improved solid state photodiode based flame scanner, which is characterized by being compact, robust and easy to install.

SUMMARY OF THE PRESENT INVENTION

In accordance with the present invention there is provided a new and improved silicon carbide photodiode based flame scanner that is suitable for use for purposes of effecting therewith individual burner flame discrimination in multi-fuel fired steam generators, i.e., boilers and furnaces.

The subject silicon carbide photodiode based flame scanner is predicated on the use of a specific solid state photodiode that is only sensitive to the ultraviolet (UV) energy emitted from a near field burner flame. To this end, the high flame sensitivity achieved thereby by monitoring in the ultraviolet (UV) range is combined with the high reliability, stability and sensitivity associated with solid state photodiodes. The high sensitivity to flame ultraviolet (UV) emissions made possible through the use of the specific solid state photodiode, i.e., the silicon carbide photodiode, allows the subject silicon carbide photodiode based flame scanner to produce a near field flame signal that has clear, distinct features over the signal produced by background radiation alone. As such, this means that the subject silicon carbide photodiode based flame scanner can readily determine the presence of burner flame without having to change trip setpoints when fuels are changed.

In accordance with the present invention, the specific new silicon carbide photodiode upon which the subject silicon carbide photodiode based flame scanner is predicated replaces the conventional photodiodes heretofore employed in the prior art. More specifically, the specific new silicon carbide photodiode upon which in accordance with the present invention the subject silicon carbide photodiode based flame scanner is predicated has a spectral response curve wherein this specific new silicon carbide photodiode is very responsive in the ultraviolet (UV) range, i.e., up to 380 manometers, with little to no response in the visible or higher range, i.e., greater than 380 nanometers. Moreover, the response range thereof is spectrally broader than ultraviolet (UV) tubes and envelopes the significant ultraviolet (UV) emission bands that ultraviolet (UV) tubes miss. Further, the upper, i.e., longer wavelength, range end of the response curve of the specific new silicon carbide photodiode based flame scanner upon which in accordance with the present invention the subject silicon carbide photodiode based flame scanner is predicated overlaps the emission continuum that is characteristic of oil and coal flames. However, the responsivity of the specific new silicon carbide photodiode naturally falls from 30% to 10% in this wavelength region. The result is that the signal amplitude sensitivity of the specific new silicon carbide photodiode is of similar magnitude to either ultraviolet (UV) emissions or the oil/coal emission continuum. This permits the specific new silicon carbide photodiode to be more responsive to the near field flame versus any highly luminescent background flames of the visible and NIR spectrum.

The specific new silicon carbide photodiode upon which in accordance with the present invention the subject silicon carbide photodiode based flame scanner is predicated is advantageously characterized over the ultraviolet (UV) tube in that the output signal of the specific new silicon carbide photodiode provides a continuous analog signal versus the pulsed output signal, which is supplied by the ultraviolet (UV) tube. Moreover, the electronics needed to support the high voltage supply for ultraviolet (UV) tubes are also not required with the specific new silicon carbide photodiode, nor is the mechanical shutter mechanism required therewith. Furthermore, the specific new silicon carbide photodiode upon which in accordance with the present invention the subject silicon carbide photodiode based flame scanner is predicated is advantageously characterized over conventional other forms of solid state photodiodes, such as silicon (Si) and gallium phosphide (GaP) photodiodes, in that the specific new silicon carbide photodiode has much greater responsivity in the ultraviolet (UV) range and also in that additional optical filtering is not required therewith.

DESCRIPTION OF THE PREFERRED EMBODIMENT

Figure 1:
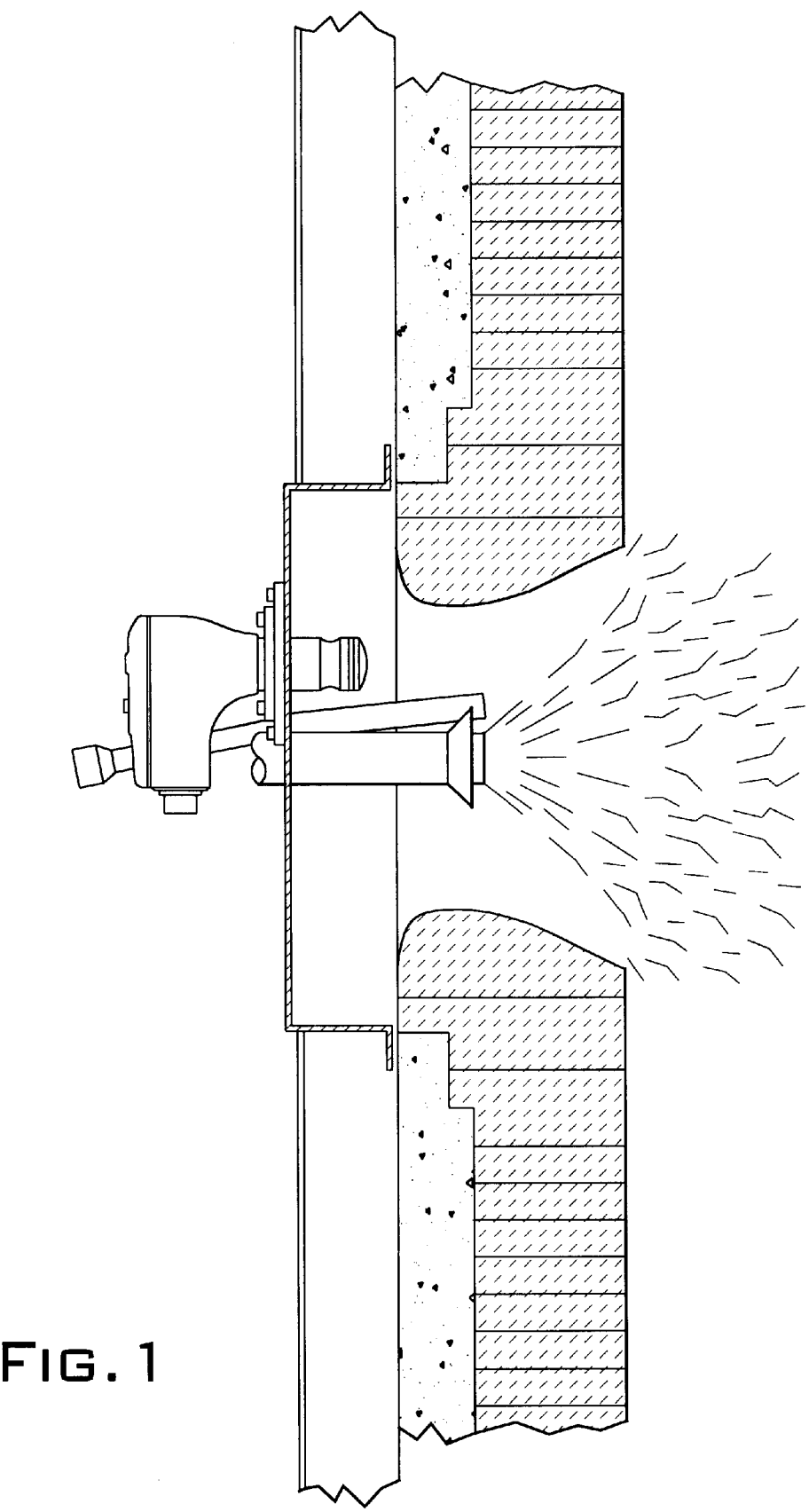
FIG. 1 is a diagrammatic representation of a silicon carbide photodiode based flame scanner, constructed in accordance with the present invention, illustrated cooperatively associated with a wall-mounted burner.

Referring now to the drawings, and more particularly to FIG. 1 thereof, there is depicted therein a silicon carbide photodiode based flame scanner, generally designated by the reference numeral 10, which in accordance with the present invention and as shown in FIG. 1 of the drawings is capable of being cooperatively associated with a wall-mounted burner, generally designated in FIG. 1 by the reference numeral 12. With further reference to FIG. 1 of the drawings, the wall-mounted burner 12, as is depicted in FIG. 1, is suitably mounted, in a manner well-known to those skilled in the art through the use of any conventional form of mounting means (not shown) suitable for use for such a purpose, in an opening, denoted by the reference numeral 14 in FIG. 1, which is suitably provided for this purpose in a wall, denoted in FIG. 1 by the reference numeral 16 of a multifossil fuel fired steam generator, generally designated by the reference numeral 18. The wall-mounted burner 12, in a manner well-known to those skilled in the art, is operative to effect the burning of fossil fuel and air such that the flame, which is generally designated in FIG. 1 by the reference numeral 20, is produced from such burning thereof. It is this flame, i.e., the flame 20, that as will be described more fully hereinafter the silicon carbide photodiode based flame scanner 10, when in the manner depicted in FIG. 1 of the drawings is cooperatively associated with the wall-mounted burner 12, is designed to be operative for purposes of effecting with the silicon carbide photodiode based flame scanner 10 individual burner flame discrimination of he flame 20 that is produced as a consequence of the burning of fossil fuel and air in the fossil, multi-fuel, fired steam generator 18, such burning resulting from the operation of the wall-mounted burner 12.

A description will next be had herein of the nature of the construction and the mode of operation, in accordance with the present invention, of the silicon carbide photodiode based flame scanner 10. For this purpose, reference will be had in particular to FIG. 2 of the drawings. To this end, the silicon carbide photodiode based flame scanner 10, as will be best understood with reference to FIG. 2 of the drawings, is comprised principally of the following components: a cam-lock scanner head, generally designated by the reference numeral 22 in FIG. 2, and a cam-lock scanner head cover plate, generally designated by the reference numeral 24 in FIG. 2.

Figure 2:
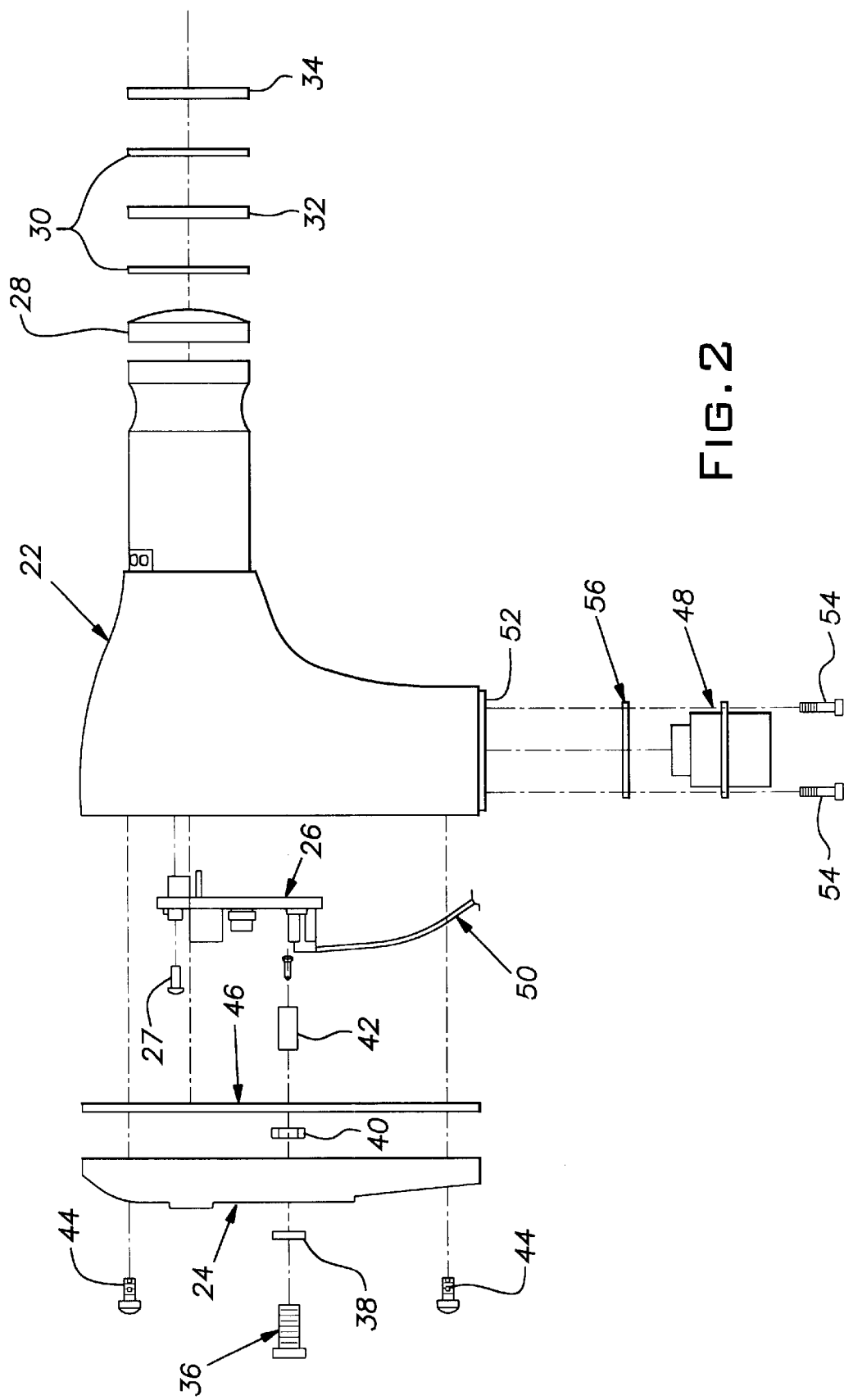
FIG. 2 is an exploded view of a silicon carbide photodiode based flame scanner constructed in accordance with the present invention.

Continuing with the description of the cam-lock scanner head 22, there is suitably supported in mounted relation therewith in a printed circuit board, generally designated by the reference numeral 26 in FIG. 2. The printed circuit board 26 may be supported in mounted relation on the cam-lock scanner head 22 by means of any conventional form of fastening means suitable for use for such a purpose, such as by means of the fastener, denoted in FIG. 2 by the reference numeral 27, with the fastener 27 being suitably received in a conventional manner in an opening (not shown in the interest of maintaining clarity of illustration in the drawings) with which the cam-lock scanner head 22 is suitably provided for this purpose. Contained on the printed circuit board 26 is the electronics circuitry of the silicon carbide photodiode based flame scanner 10. A description will be had herein subsequently of the electronics circuitry of the silicon carbide photodiode based flame scanner 10 with reference in particular to FIG. 3 of the drawings. With further reference to the cam-lock scanner head 22, the cam-lock scanner head 22 also, as will be best understood with reference to FIG. 2 of the drawings, has cooperatively associated therewith at the end thereof, a plane convex lens 28, a pair of retaining rings 30, an O-ring 32, and a window 34. The retaining rings 30 secure the window 34 in overlying relation on the lens 28 with the O-ring 32 mounted between the lens 28 and the window 34 in sealing relation therebetween.

Next, continuing with the description of the cam-lock scanner head cover plate 24, cooperatively associated with the cam-lock scanner head cover plate 24, as will be best understood with reference to FIG. 2 of the drawings, is a clear plastic light pipe, generally designated in FIG. 2 of the drawings by the reference numeral 36. The clear plastic light pipe 36 extends through an opening (not shown in the interest of maintaining clarity of illustration in the drawings) with which the cam-lock scanner head cover plate 24 is suitably provided for this purpose. In accordance with the illustration thereof in FIG. 2 of the drawings, the clear plastic light pipe 36 has cooperatively associated therewith a gasket, denoted in FIG. 2 by the reference numeral 38; a jam nut, denoted in FIG. 2 by the reference numeral 40; and shrink tubing, denoted in FIG. 2 by the reference numeral 42. The jam nut 40 is designed to be operative in a conventional manner for purposes of effecting therewith the securing of the clear plastic light pipe 36 in the opening (not shown) provided for this purpose in the cam-lock scanner head cover plate 24 such that the clear plastic light pipe 36 is secured in mounted relation on the cam-lock scanner head cover plate 24.

With further regard to the cam-lock scanner head cover plate 24 and the cam-lock scanner head 22, the cam-lock scanner head cover plate 24 is designed to be secured in mounted relation on the cam-lock scanner head 22 by means of a plurality of fasteners, each denoted in FIG. 2 for ease of reference thereto by the same reference numeral 44. Although only two such fasteners 44 are shown in FIG. 2, it is to be understood that in accordance with the best mode embodiment of the silicon carbide photodiode based flame scanner 10 of the present invention, there are three such fasteners 44 employed for purposes of effecting therewith the securing of the cam-lock scanner head cover plate 24 in mounted relation on the cam-lock scanner head 22.

Furthermore, although not illustrated in FIG. 2 of the drawings, it is to be understood that both the cam-lock scanner head cover plate 24 and the cam-lock scanner head 22 are each provided with suitably located openings (not shown in the interest of maintaining clarity of illustration in the drawings) to permit the fasteners 44 to extend through the cam-lock scanner head cover plate 24 by means of such openings (not shown) located therein and to be received in threaded engagement within such openings (not shown) that are provided in the cam-lock scanner head 22 for this purpose. In addition, a gasket, generally designated in FIG. 2 by the reference numeral 46, is preferably employed in interposed relation between the cam-lock scanner head cover plate 24 and the cam-lock scanner head 22.

For purposes of completing the description of the silicon carbide photodiode based flame scanner 10, as illustrated in FIG. 2 of the drawing, a description will next be had herein of the manner and means by which electrical interconnection is effected between the silicon carbide photodiode based flame scanner 10 of the present invention, and more specifically the printed circuit board 26 thereof, and an external means, be such external means a burner management system or some other form of external means, to which the flame monitoring effected through operation of the silicon carbide photodiode based flame scanner 10 of the present invention and more particularly the signal produced by the silicon carbide photodiode based flame scanner 10 of the present invention representative of such flame monitoring by the silicon carbide photodiode based flame scanner 10 is transmitted from the silicon carbide photodiode based flame scanner 10 to such external means. To this end, cooperatively associated with the cam-lock scanner head 22 is a connector, i.e., preferably a circular connector, generally designated in FIG. 2 by the reference numeral 48. As will be best understood with reference to FIG. 2 of the drawings, extending from and connected in electrical circuit relation with the printed circuit board 26 is an electrical lead, generally designated in FIG. 2 by the reference numeral 50. Although not shown in the drawings in the interest of maintaining clarity of illustration therein, it is to be understood that the lead 50 is designed so that the lead 50 extends from the printed circuit board 26 through the body of the cam-lock scanner head 22 to the end, denoted in FIG. 2 by the reference numeral 52, of the cam-lock scanner head 22 whereat a suitable electrical connection is effected between the lead 50 and the circular connector 48.

Referring further thereto, the circular connector 48 is designed to be secured in mounted relation to the end 52 of the cam-lock scanner head 22 through the use of any conventional form of fastening means suitable for use for such a purpose, such as by means of a plurality of fasteners, each denoted in FIG. 2 for ease of reference thereto by the same reference numeral 54. Although only two such fasteners 54 are shown in FIG. 2, it is to be understood that in accord with the best mode embodiment of the silicon carbide photodiode based flame scanner 10, there are four such fasteners 54 employed for purposes of effecting therewith the securing of the circular connector 48 in mounted relation on the cam-lock scanner head 22. Furthermore, although not illustrated in FIG. 2 of the drawings, it is to be understood that both the circular connector 48 and the end 52 of the cam-lock scanner head 22 are provided with suitably located openings (not shown in the interest of maintaining clarity of illustration in the drawings) to permit the fasteners 54 to extend through the circular connector 48 by means of such openings (not shown) that are provided for this purpose in the circular connector 48 and to be received in threaded engagement within such openings (not shown) that are provided in the end 52 of the cam-lock scanner head 22 for this purpose. In addition, a gasket, generally designated in FIG. 2 by the reference numeral 56, is preferably employed in interposed relation between the circular connector 48 and the end 52 of the cam-lock scanner head 22. The circular connector 48 may take the form of any conventional type of connector that is suitable for use for purposes of effecting therewith both the mechanical connection that is desired to be accomplished between the silicon carbide photodiode based flame scanner 10 and an appropriate external means as well as concomitantly the electrical connection that is desired to be accomplished between the silicon carbide photodiode based flame scanner 10 and an appropriate external means.

A description will now be set forth herein in summary form of the electronics circuitry of the silicon carbide photodiode based flame scanner 10 of the present invention. For this purpose, reference will be had particularly to FIG. 3 of the drawings. Thus, as will be best understood with reference to FIG. 3 of the drawings in association with FIG. 2 of the drawings, after passing through the lens 28 of the cam-lock scanner head 22, which are depicted in FIG. 2 of the drawings, ultraviolet light impinges upon the silicon carbide photodiode that is suitably mounted for this purpose on the printed circuit board 26. This ultraviolet light is then converted into a photocurrent, which, in turn, as depicted by the arrow, denoted in FIG. 3 by the reference numeral 58 that is associated with the designation PD1, flows through one of the feedback resistances, which are connected with the amplifier U1, generally designated in FIG. 3 by the reference numeral 60. The path of the photocurrent, and the subsequent feedback resistance, is selected by the jumper JP1, generally designated in FIG. 3 by the reference numeral 62. Jumper JP1, denoted by reference numeral 62, is thus operative to set the gain of the circuit to Low, Medium, or High. Associated with three position jumper JP1 are the three R-C feedback circuits R3A-C3A, R3B-C3B and R3C-C3C. Continuing, the photocurrent flowing through the feedback resistance creates a voltage, which is amplified by the amplifier U1, denoted by the reference numeral 60, and appears on Pin 6, denoted in FIG. 3 by the reference numeral 64, thereof. Amplifier U1, denoted by reference numeral 60, has been configured, with respect to the generated photocurrent, with an appropriate bias current level into its inputs at Pins 2 and 3, denoted by reference numerals 66 and 68, respectively, in FIG. 3, thereof. Amplifier U1 has associated therewith capacitors C1 and C2.

Figure 3:
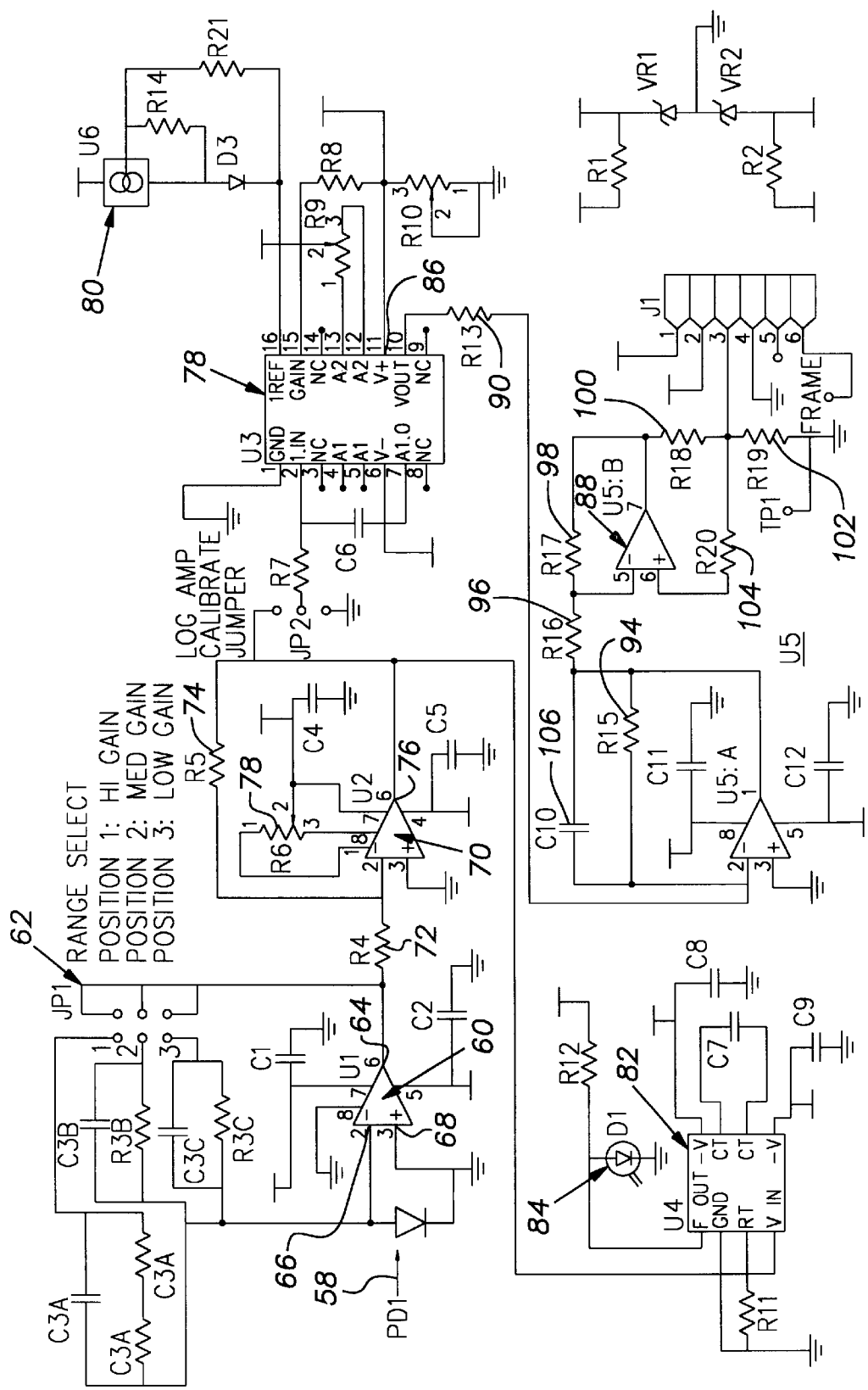
FIG. 3 is a schematic diagram of the electronics circuitry of a silicon carbide photodiode based flame scanner constructed in accordance with the present invention.

With further reference to the electronics circuitry of the silicon carbide photodiode based flame scanner 10, a second stage with an associated gain is formed by amplifier U2, generally designated in FIG. 3 by reference numeral 70, resistance R4, denoted in FIG. 3 by the reference numeral 72, and resistance R5, denoted in FIG. 3 by the reference numeral 74. Amplifier U1 has associated therewith capacitors C3 and C4. The output of amplifier U2, denoted by reference numeral 70, appears at Pin 6, denoted in FIG. 3 by the reference numeral 76, thereof, and is a voltage directly proportional to the amount of ultraviolet light striking silicon carbide photodiode PD1. Potentiometer R6, denoted in FIG. 3 by the reference numeral 78 is used to induce an offset in the output of amplifier U2, denoted by reference numeral 70, so that the voltage at Pin 6, denoted by reference numeral 76, does not go to zero when no light is illuminating the silicon carbide photodiode based flame scanner 10.

Continuing, the logarithm of the voltage at Pin 6, denoted by reference numeral 76, of the amplifier U2, denoted by reference numeral 70, is calculated with the logarithmic amplifier U3, generally designated by reference numeral 78. The purpose of the logarithmic amplifier U3, denoted by the reference numeral 78, is to provide dynamic range of appropriate magnitude over which the silicon carbide photodiode PD1 is operated. The voltage at Pin 6 of amplifier U2 is connected in one position of a Jumper JP2 through a resistor R7 to pin 2 of logarithmic amplifier U3 and through a capacitor C6 connected to resistor R7 to pin 7 of the amplifier U3. Jumper JP2 in its other position allows amplifier U3 to be calibrated. Fixed resistor R8 and variable resistor R10 are used to set the gain for amplifier U3 and adjustable resistor R9 connects pin 12 to pin 13. Amplifier U6, generally designated by reference numeral 80, is configured to provide a reference current to the logarithmic amplifier U3, denoted by the reference numeral 78. Diode D3 and resistors R14 designated as 92 and R21 are associated with amplifier U6.

With further regard to the description of the electronics circuitry of the silicon carbide photodiode based flame scanner 10, the output at Pin 6, denoted by the reference numeral 76 of the amplifier U2, denoted by reference numeral 70, is also applied to a voltage to frequency converter U4, generally designated by the reference numeral 82. This circuit drives a light emitting diode D1, generally designated by reference numeral 84, which is visible through the clear plastic light pipe 36 with which the silicon carbide photodiode based flame scanner 10 is suitably provided for this purpose. This light emitting diode D1, denoted by reference numeral 84 will flash when no light is illuminating the silicon carbide photodiode PD1, and will increase in frequency as the silicon carbide photodiode PD1 is illuminated. The flashing rate of the light emitting diode D1, denoted by reference numeral 84 acts as an aid to the operator when the silicon carbide photodiode based flame scanner 10 is installed and aligned in cooperative association with a wall mounted burner, such as the wall-mounted burner 12, which is illustrated in FIG. 1 of the drawings. Various pins of voltage to frequency converter U4 are connected to ground by resistors R11 and R12 and by capacitors C8 and C9 as is shown in FIG. 3. The CT and -CT pins of U4 are connected to each other by a capacitor C7.

Concluding the description herein of the electronics circuitry of the silicon carbide photodiode based flame scanner 10 of the present invention, the output at Pin 10, denoted in FIG. 3 by the reference numeral 86, of the logarithmic amplifier U3, denoted by the reference numeral 78, is applied to a current driver circuit formed from amplifier U5, generally designated by the reference numeral 88, resistors R13 and R15 to R20, denoted in FIG. 3 by reference numerals 90, 94, 96, 98, 100, 102 and 104, respectively, and capacitor C10, denoted in FIG. 3 by the reference numeral 106. This circuit converts the voltage output at Pin 10, denoted by reference numeral 86, of logarithmic amplifier U3, denoted by reference numeral 78, into a signal that is suitable for being transmitted over long cable distances to the processing electronics of the external means to which the silicon carbide photodiode based flame scanner 10 of the present invention is interconnected through operation of the circular connector 48, reference having been made hereinbefore to circular connector 48. As is shown in FIG. 3, amplifier U5 comprises two identical has two identical amplifier U5:A and U5:B. Capacitors C11 and C12 are associated with amplifier U5:A. Amplifier U5 also includes a test point TP1. Amplifier U5 also includes a connection point named "FRAME." Amplifier U5 further includes a header designated in FIG. 3 as J1. As is well known to those of ordinary skill in the art, a header is used to connect the printed circuit board on which the circuit of FIG. 3 is mounted to the associated power/signal cable.

The circuitry of FIG. 3 also includes first and second filtering circuits. Diode VR1 and resistor R1 comprise the first filtering circuit and diode VR2 and resistor R2 comprise the second filtering circuit.

Thus, in accordance with the present invention there has been provided a new and improved flame scanner particularly suitable for employment in steam generators, i.e., boilers and furnaces. Besides, there has been provided in accord with the present invention such a new and improved flame scanner, which is characterized in that when so employed in steam generators is operative both for purposes of reliably monitoring an individual burner flame and for purposes of detecting, based on such monitoring, unstable operation or flame-out conditions over all background firing conditions. As well, in accordance with the present invention there has been provided such a new and improved flame scanner, which is characterized in that the operation thereof is based on the use of a solid state photodiode, which is operative for purposes of effecting therewith the conversion of ultraviolet (UV) energy from the individual burner flame into electrical signals. Moreover, there has been provided in accord with the present invention such a new improved solid state photodiode based flame scanner, which is characterized in that the operation thereof is that of a multi-fuel flame scanner, which is designed for use with steam generators, i.e., boilers and furnaces, that fire gas, oil, coal or any combination of these three fuels. Also, in accordance with the present invention there has been provided such a new and improved solid state photodiode based flame scanner, which is characterized in that years of reliable service in a power plant environment are capable of being derived therefrom. Further, there has been provided in accord with the present invention such a new and improved solid state photodiode based flame scanner, which is characterized in that the sensitivity thereof is only to the ultraviolet (UV) energy that is emitted from a near field burner flame. In addition, in accordance with the present invention there has been provided such a new and improved solid state photodiode based flame scanner, which is characterized in that a near field flame signal is produced thereby, which has clear, distinct features over the signal produced by background radiation alone. Furthermore, there has been provided in accord with the present invention such a new and improved solid state photodiode based flame scanner, which is characterized in that the presence of burner flame can be readily determined thereby without having to change trip setpoints when fuels are changed. Penultimately, in accordance with the present invention there has been provided such a new and improved solid state photodiode based flame scanner, which is characterized in that the use thereof is equally well suited either for new applications or for retrofit applications. Finally, there has been provided in accord with the present invention such a new and improved solid state photodiode based flame scanner, which is characterized by being compact, robust and easy to install.

While several embodiments of our invention have been shown or alluded to herein, it will be appreciated that modifications thereof, some of which have been alluded to hereinabove, may still be readily made thereto by those skilled in the art. We, therefore, intend by the appended claims to cover the modifications alluded to herein as well as all the other modifications, which fall within the true spirit and scope of our invention.

What is claimed is:

1. A fossil fuel-fired steam generator comprising:

a first burner and one or more adjacent burners;

a first flame scanner operative for distinguishing and monitoring flame in said first burner from background flame generated from said one or more adjacent burners comprising:

a.) a housing having a first end and a second end and a silicon carbide photodiode therein for distinguishing and monitoring flame in said first burner, said photodiode converting light from flare in said first burner impinging thereon into a photocurrent;

b) lens means secured in mounted relation within said first end of said housing; and c) a circuit in mounted relation within said housing, said circuit operative to provide a signal representative of the condition of said distinguished and monitored first burner flame based on the distinguishing and monitoring with said silicon carbide photodiode of said distinguished and monitored first burner flame in said fossil fuel-fired steam generator, said circuit comprising a log amplifier responsive to a voltage representative of said photocurrent for producing from said voltage a further voltage related to the amount of light impinging on said photodiode.

2. The fossil fuel-fired steam generator of claim 1 wherein said lens means is a plano convex lens.

3. The fossil fuel-fired steam generator of claim 1 wherein said circuit includes said silicon carbide photodiode.

4. A fossil fuel-fired steam generator comprising:

a first burner and one or more adjacent burners;

a first flame scanner operative for distinguishing and monitoring flame in said first burner from background flame generated in said one or more adjacent burners comprising:

a.) a photodiode for distinguishing and monitoring said flame in said first burner, said photodiode converting light from said first burner flame impinging thereon into a photocurrent;

b.) an amplifier for converting said photocurrent to a voltage with an offset so that said voltage does not go to zero when no light from said first burner flame is impinging on said photodiode; and c.) a log amplifier responsive to said voltage with said offset in its entirety for producing from said voltage with offset a further voltage related to the amount of light impinging on said photodiode.

5. The flame scanner of claim 4 wherein said photodiode is a silicon carbide photodiode.

6. The flame scanner of claim 4 further including a housing and a plano convex lens mounted on said housing, said photodiode positioned in said housing so that light from said first burner flame enters said lens and illuminates said photodiode.

7. The flame scanner of claim 5 further including a housing and a plano convex lens mounted on said housing, said silicon carbide photodiode positioned in said housing so that light from said first burner flame enters said lens and illuminates said silicon carbide photodiode.

8. A fossil fuel fired steam generator comprising:

a multiplicity of burners located adjacent to each other;

a multiplicity of flame scanners each associated with a respective one of said multiplicity of adjacent burners operative for distinguishing and monitoring flame in said associated one of said multiplicity of adjacent burners from background flame generated from any other of said multiplicity of adjacent burners, each of said multiplicity of flame scanners comprising:

a.) a housing having a first end and a second end and a silicon carbide photodiode therein for distinguishing and monitoring flame in only said associated one of said multiplicity of adjacent burners, said photodiode converting light from only said associated one of said adjacent burners flame impinging thereon into a photocurrent;

b.) lens means secured in mounted relation within said first end of said housing; and c.) a circuit in mounted relation within said housing, said circuit operative to provide a signal representative of the condition of said distinguished and monitored associated one of said multiplicity of adjacent burner flames based on the distinguishing and monitoring with said silicon carbide photodiode of said distinguished and monitored adjacent burner flame in said fossil fuel-fired steam generator, said circuit comprising a log amplifier responsive to a voltage representative of said photocurrent for producing from said voltage a further voltage related to the amount of light impinging on said photodiode.

9. The fossil fuel fired steam generator of claim 8 wherein for each of said multiplicity of flame scanners said lens means is a plano convex lens.

10. The fossil fuel fired steam generator of claim 8 wherein for each of said multiplicity of flame scanners said circuit includes said silicon carbide photodiode.

* * * * *